US009722997B2

(12) United States Patent
Zhang

(10) Patent No.: US 9,722,997 B2
(45) Date of Patent: Aug. 1, 2017

(54) METHOD AND APPARATUS OF DETECTING WEAK PASSWORD

(71) Applicant: Alibaba Group Holding Limited, Grand Cayman, KY (US)

(72) Inventor: Wen Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 71 days.

(21) Appl. No.: 14/687,811

(22) Filed: Apr. 15, 2015

(65) Prior Publication Data

US 2015/0304302 A1 Oct. 22, 2015

(30) Foreign Application Priority Data

Apr. 16, 2014 (CN) .......................... 2014 1 0153728

(51) Int. Cl.
*H04L 9/32* (2006.01)
*H04L 29/06* (2006.01)
*G06F 21/46* (2013.01)

(52) U.S. Cl.
CPC ............ *H04L 63/083* (2013.01); *G06F 21/46* (2013.01); *H04L 63/1408* (2013.01); *H04L 63/061* (2013.01)

(58) Field of Classification Search
CPC . H04L 63/083; H04L 63/1408; H04L 63/061; G06F 21/46
USPC ......................................................... 713/171
See application file for complete search history.

(56) References Cited

U.S. PATENT DOCUMENTS

| 7,581,245 | B2 | 8/2009 | Rojewski |
| 7,685,431 | B1 | 3/2010 | Mullany |
| 8,407,784 | B2 | 3/2013 | Troyansky |
| 8,769,607 | B1 | 7/2014 | Jerdonek et al. |
| 8,886,950 | B2 | 11/2014 | Carolan |
| 8,973,116 | B2 | 3/2015 | Wheeler |
| 2004/0073815 | A1 | 4/2004 | Sanai et al. |
| 2005/0198537 | A1* | 9/2005 | Rojewski ................ G06F 21/46 726/19 |
| 2013/0055379 | A1 | 2/2013 | Adams et al. |

(Continued)

OTHER PUBLICATIONS

PCT Search Report and Written Opinion mailed Jul. 24, 2015 for PCT application No. PCT/US15/26017, 9 pages.

*Primary Examiner* — Mohammad W Reza
(74) *Attorney, Agent, or Firm* — Lee & Hayes, PLLC

(57) ABSTRACT

A method and an apparatus of detecting a weak password are disclosed. The method comprises: receiving a password to be detected; acquiring an identity information set of a user of the password to be detected, the identity information set including a plurality of pieces of identity information of the user and associated users thereof; detecting whether identity information associated with the password to be detected exists in the identity information set; and determining that the password to be detected is a weak password if the identity information associated with the password to be detected exists in the identity information set. The technical solution of the present disclosure can detect whether a password to be detected is set up by a user using identity information thereof or identity information of a user who be closely associated therewith, thus determining whether the password to be detected is prone to cracking, and thereby further improving the security of the password of the user.

19 Claims, 5 Drawing Sheets

(56) References Cited

U.S. PATENT DOCUMENTS

| | | |
|---|---|---|
| 2013/0179970 A1 | 7/2013 | Bhola et al. |
| 2013/0227684 A1 | 8/2013 | Troyansky |
| 2013/0269010 A1* | 10/2013 | Wheeler ................ G06F 21/46 726/6 |
| 2014/0068731 A1 | 3/2014 | Belisario et al. |
| 2014/0068733 A1* | 3/2014 | Belisario ................ G06F 21/46 726/6 |

* cited by examiner

METHOD AND APPARATUS OF DETECTING WEAK PASSWORD

CROSS REFERENCE TO RELATED PATENT APPLICATION

This application claims foreign priority to Chinese Patent Application No. 2014101537288 filed on Apr. 16, 2014, entitled "Method and Apparatus of Detecting Weak Password", which is hereby incorporated by reference in its entirety.

TECHNICAL FIELD

The present disclosure relates to the field of Internet technology, and in particular, to methods and apparatuses of detecting a weak password.

BACKGROUND

In the existing Internet environment, identity-related information of users is no longer private information, and the security of data and passwords of the users is severely affected. When setting up passwords, some users use passwords that are too simple or set up passwords using information that is associated with themselves or associated with their relatives or friends to remember the passwords easily, and such passwords are easily cracked.

At present, a commonly seen method of detecting a weak password of a user mainly includes: determining whether a password set up by a user is too simple by using a dictionary of commonly used weak passwords; or determining whether a password set up by the user is related to identity information thereof based on identity-related information of the user, such as an identity card number, a mobile phone number, a bank card number, etc.

An existing technology of detecting a weak password of a user can only perform detection based on commonly used weak passwords and identity-related information of the user. However, some users always use identity information of the people who have a close relationship with them for setting up passwords, and weak passwords that are set up in such cases cannot be detected by the existing technology, thus failing to further improve the security of the passwords of the users.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

A main objective of the present disclosure is to provide a method and an apparatus of detecting a weak password to solve the failure of detecting a password that is set up by a user using identity information of other users that are related to the user in the existing technology.

The present disclosure provides a method of detecting a weak password, which includes: receiving a password to be detected; acquiring an identity information set of a user of the password to be detected, the identity information set including a plurality of pieces of identity information of the user and users related thereto; detecting whether identity information associated with the password to be detected exists in the identity information set; and determining that the password to be detected is a weak password if the identity information associated with the password to be detected exists in the identity information set.

Another aspect of the present disclosure provides an apparatus of detecting a weak password, which includes: a receiving module used for receiving a password to be detected; an acquisition module used for acquiring an identity information set of a user of the password to be detected, the identity information set including a plurality of pieces of identity information of the user and users related thereto; a detection module used for detecting whether identity information associated with the password to be detected exists in the identity information set; and a determination module used for determining that the password to be detected is a weak password if the identity information associated with the password to be detected exists in the identity information set.

Compared with the existing technology, the technical solution of the present disclosure can detect whether a password to be detected is set up by a user using identity information thereof or identity information of a user who is closely associated therewith, thereby determining whether the password to be detected is weak or prone to cracking, and thus further improving the security of the password of the user.

BRIEF DESCRIPTION OF THE DRAWINGS

The accompanying drawings described herein are provided for further understanding of the present disclosure, and constitute a part of the present disclosure. The exemplary embodiments of the present disclosure and the description thereof are used for illustrating the present disclosure, and should not be construed as any improper limitations to the present disclosure. In the accompanying drawings.

DETAILED DESCRIPTION

An idea of the present disclosure is to determine one or more related users who are closely associated with a user based on activities of the user to acquire a plurality of pieces of identity information of the user and the associated users thereof, and to determine whether a password set up by the user is associated with the plurality of pieces of identity information based on the plurality of pieces of identity information, thereby determining whether the password to be detected is a weak password.

In order to make objectives, technical solutions, and advantages of the present disclosure clearer, the technical solutions of the present disclosure are described herein in a clear and complete manner with reference to the exemplary embodiments and corresponding accompanying drawings of the present disclosure. Apparently, the described embodiments are merely a part and not all of the embodiments of the present disclosure Based on the embodiments in the present disclosure, all other embodiments obtained by one of ordinary skill in the art without making any creative efforts shall belong to the protection scope of the present disclosure.

According to an embodiment of the present disclosure, a method of detecting a weak password is provided.

Figure 1:
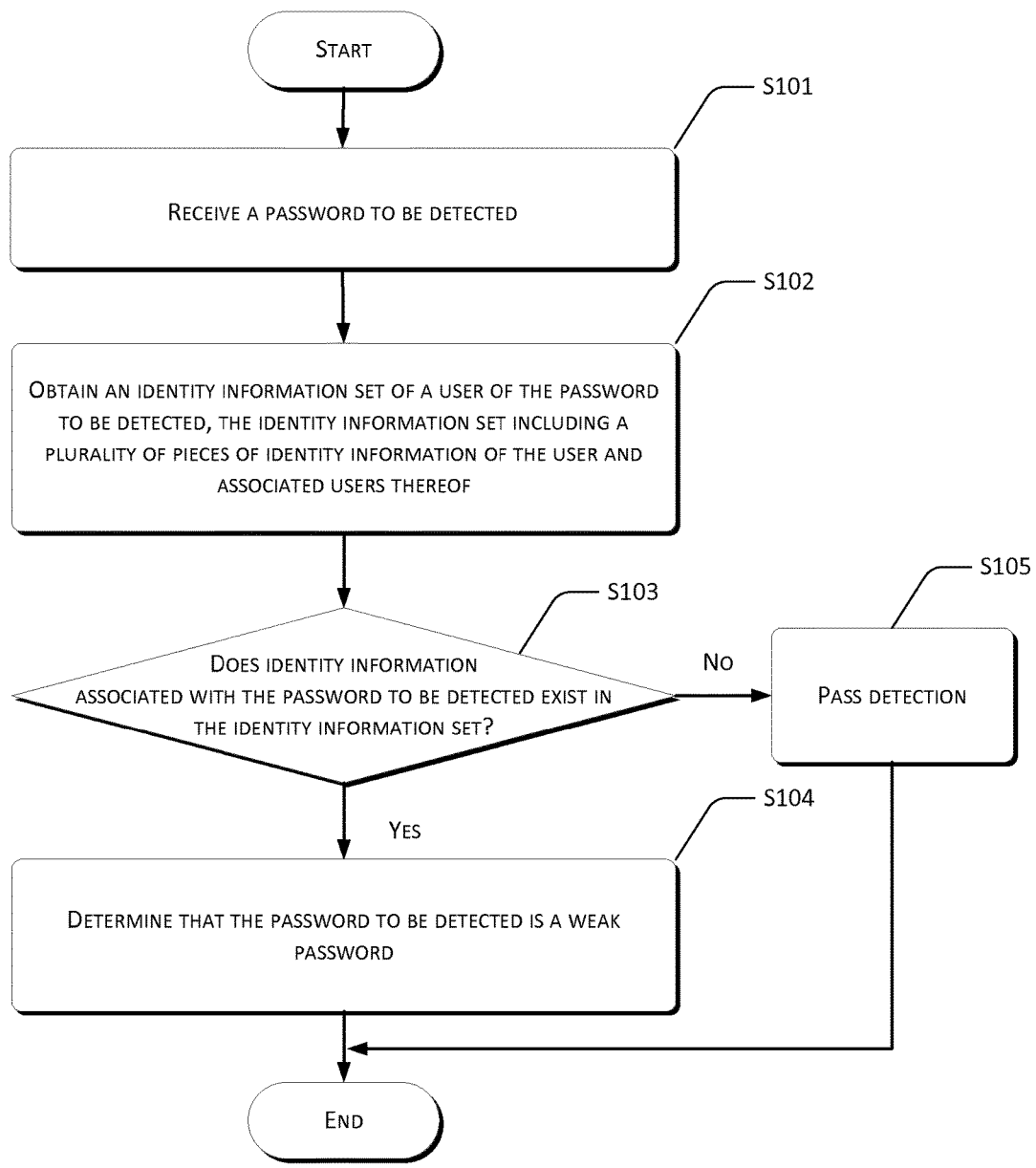
FIG. 1 is a flowchart of a method of detecting a weak password according to an embodiment of the present disclosure.

Referring to FIG. 1, FIG. 1 is a flowchart of a method of detecting a weak password according to an embodiment of the present disclosure.

At S101, a password to be detected is received.

The password to be detected may be a login password used when a user logs into an application such as a client application or a webpage application, a verification password used when the user uses the client application or the webpage application to perform a particular operation (the particular operation which is based on a service provided by a server), for example, a payment password during a payment transaction, etc. It should be understood that the password to be detected is not limited thereto, but may be any password that needs to be detected.

At S102, an identity information set of a user of the password to be detected is obtained. The identity information set including a plurality of pieces of identity information of the user and users associated therewith.

In order to illustrate this method block more clearly, an optional example implementation of this method block is described with reference to FIG. 2.

Figure 2:
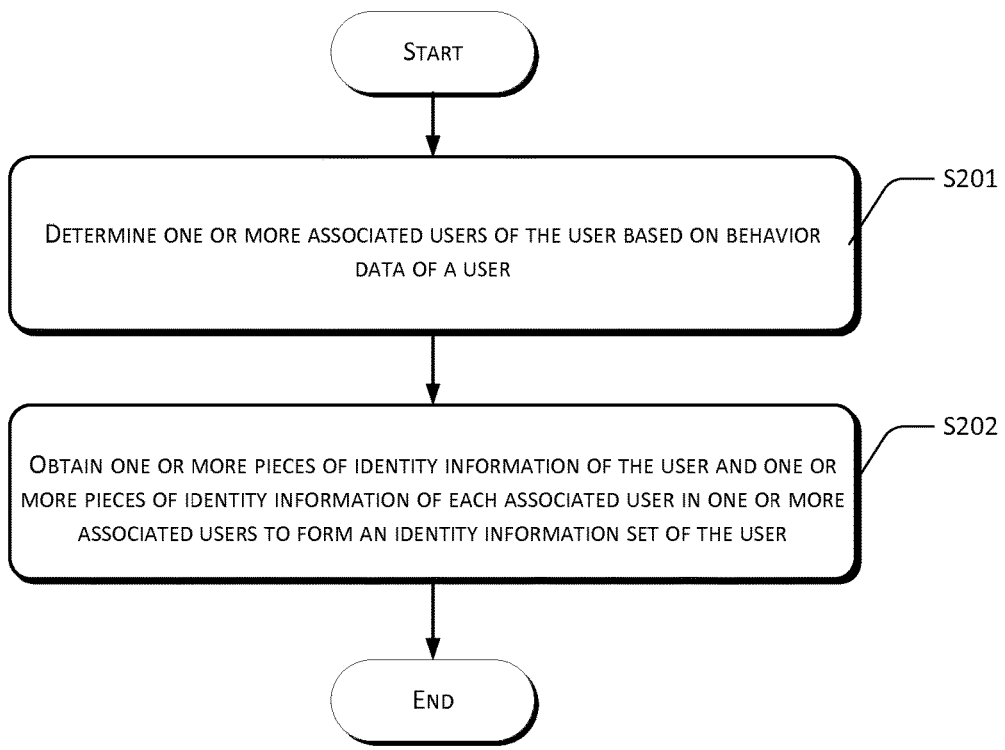
FIG. 2 is a flowchart of a procedure of acquiring an identity information set of a user of a password to be detected according to an embodiment of the present disclosure.

As shown in FIG. 2, FIG. 2 is a flowchart of a method block of acquiring an identity information set of a user of the password to be detected according to an embodiment of the present disclosure.

At S201, one or more associated users of the user are determined based on behavior data of the user.

The one or more associated users of the user may be one or more users closely associated with the user. The users closely associated with the user may include, for example, relatives or friends of the user, etc. The behavior data of the user may include: behavior data of interaction activities of the user, for example, users having a transaction activity (for example, a transfer, which includes transferring funds to other users or receiving funds transferred from other users) with the user; and behavior data of browsing activities of the user, for example, users that have been browsed by the user.

Specifically, statistics about the behavior data of the user may be collected and analyzed to acquire one or more users most closely associated with the user as the associated users of the user. A number of the one or more associated users may be determined according to specific situations. For example, by collecting statistics about users who have interacted with the user, a predetermined number of users (TopN) who have interacted with the user most frequently may be treated as the associated users of the user. Alternatively, one or more users who have interacted with the user for more than a predetermined number of times may be treated as the associated users of the user.

At S202, one or more pieces of identity information of the user and one or more pieces of identity information of each associated user in the one or more associated users are acquired to form the identity information set of the user. Each piece of identity information may be made up of multiple characters (for example, digits, letters), and the identity information may include information such as a name, an identity card number, a mobile phone number, a bank account number/card number, etc. Specifically, one or more pieces of identity information in the aforementioned identity information of the user and one or more pieces of identity information in the aforementioned identity information of each associated user of the user may be acquired to form the identity information set of the user.

Returning to FIG. 1, detection is made as to whether identity information associated with the password to be detected exists in the identity information set at S103. Specifically, detection is made as to whether the password to be detected is set up by the user using the identity information thereof or identity information of a user who is closely associated therewith.

To illustrate this method block more clearly, an optional example implementation of this method block is described with reference to FIG. 3.

Figure 3:
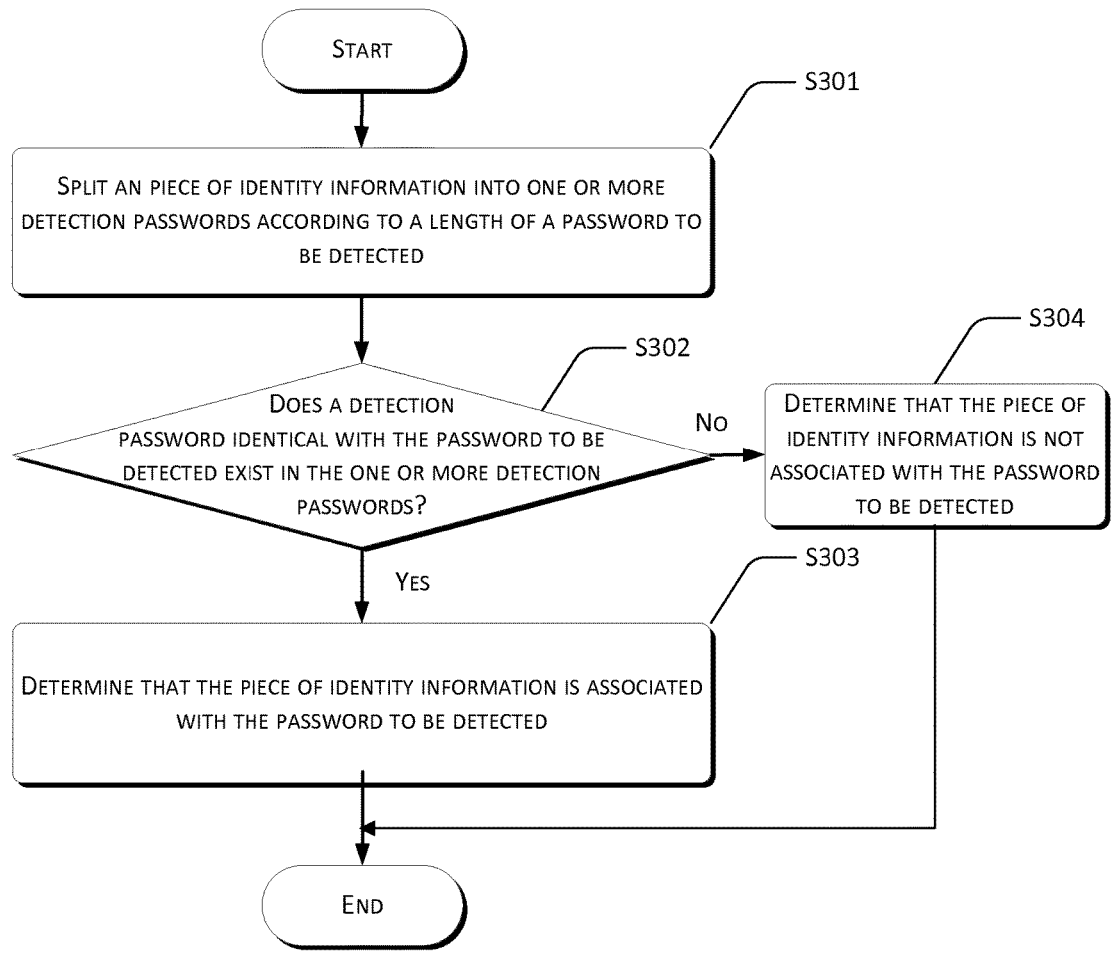
FIG. 3 is a flowchart of a procedure of detecting whether identity information associated with a password to be detected exists in an identity information set according to an embodiment of the present disclosure.

Referring to FIG. 3, FIG. 3 shows a flowchart of a method block of detecting whether identity information associated with the password to be detected exists in the identity information set (i.e., S103) according to an embodiment of the present disclosure. It should be noted that FIG. 3 shows a flowchart of determining whether the identity information is associated with the password to be detected for each piece of identity information.

At S301, each piece of identity information in the identity information set is split into one or more detection passwords based on a length of the password to be detected.

According to an embodiment of the present disclosure, a length of the password to be detected may first be acquired from a system. Each piece of identity information is then split into one or more detection passwords having the same length as the password to be detected based on the length of the password. The one or more detection passwords that are split from each piece of identity information are used for comparison with the password to be detected in a next method block to determine whether that piece of identity information is associated with the password.

Specifically, for any piece of identity information, the identity information may be split into (L−M+1) number of detection passwords which length is M according to an order of characters (such as digits, letters) in the identity information, wherein L is the length of the identity information, and M is the length of the password to be detected. For example, assuming that the length of the password to be detected is six, a piece of identity information "123456789" may be split into four detection passwords: "123456", "234567", "345678", and "456789".

At S302, a determination is made as to whether a detection password that is identical with the password to be detected exists in the one or more detection passwords that are split from each piece of identity information.

Figure 4:
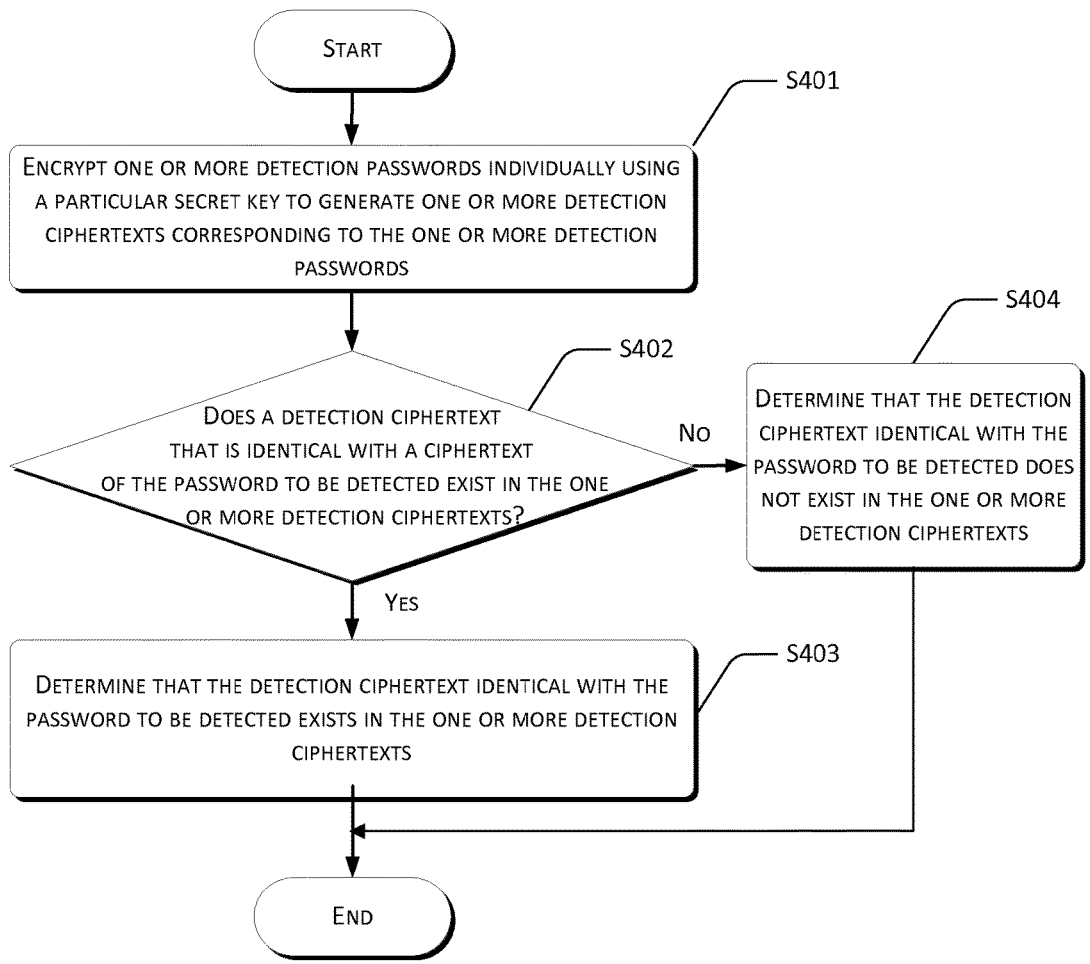
FIG. 4 is a flowchart of a procedure of determining whether a detection password that is identical with a password to be detected exists in one or more detection passwords split from each piece of identity information according to an embodiment of the present disclosure.

Referring to FIG. 4, FIG. 4 shows a flowchart of a method block of determining whether a detection password that is identical with the password to be detected exists in the one or more detection passwords split from each piece of identity information (i.e., S302) according to an embodiment of the present disclosure.

As shown in FIG. 4, for one or more detection passwords split from each piece of identity information, the one or more detection passwords are individually encrypted using a particular secret key to generate one or more detection ciphertexts corresponding to the one or more detection passwords at S401.

Specifically, when the user inputs a password (for example, an input submitted when the user sets up a password or an input submitted when the user uses a password to perform a related verification), (the system) may use a particular secret key to encrypt the password inputted by the user to generate a ciphertext of the password to prevent the password of the user from being stolen in order to ensure the security of the password of the user. Therefore, the user-inputted password received (by the server) or the acquired user-preset password stored (on the server) is the ciphertext that is encrypted using the particular secret key. Therefore, when the password to be detected is received, what is actually received is the ciphertext generated by encrypting the password to be detected using the particular secret key. Therefore, the particular secret key may be acquired. The one or more detection passwords are individually encrypted using the particular secret key to generate one or more detection ciphertexts corresponding to each detection password, in order to facilitate comparison between the one or more detection ciphertexts and the ciphertext of the password to be detected to determine whether a detection ciphertext that is identical with the ciphertext of the password to be detected exists.

At S402, a determination is made as to whether a detection ciphertext that is identical with a ciphertext of the password to be detected exists in the one or more detection ciphertexts. The ciphertext of the password to be detected is generated by encrypting the password to be detected using the particular secret key.

Specifically, the one or more detection ciphertexts may be compared with the ciphertext of the password to be detected, to determine whether each detection ciphertext is identical with the ciphertext of the password to be detected one by one.

At S403, if a detection ciphertext that is identical with the ciphertext of the password to be detected exists in the one or more detection ciphertexts, a determination is made that a detection password that is identical with the password to be detected exists in the one or more detection passwords.

The one or more detection ciphertexts and the ciphertext of the password to be detected are generated by encryption using the same secret key (i.e., the particular secret key). Therefore, upon detecting any detection ciphertext that is identical with the ciphertext of the password to be detected, a determination is made that a detection password corresponding to the detection ciphertext (i.e., the detection password from which the detection ciphertext is generated) is identical with the password to be detected. Moreover, a determination is further made that a detection password that is identical with the password to be detected exists in the one or more detection passwords. If no detection ciphertext that is identical with the ciphertext of the password to be detected exists in the one or more detection ciphertexts, a determination is made that no detection password that is identical with the password to be detected exists in the one or more detection passwords at S404.

Returning to FIG. 3, after each piece of identity information in the identity information set has individually gone through the method blocks S401-S404 as described above, if a detection password that is the same as the password to be detected is found to exist in one or more detection passwords split from any piece of identity information, a determination is made that this piece of identity information is associated with the password to be detected at S303, i.e., a determination is made that identity information associated with the password to be detected exists in the identity information set. If no detection password identical with the password to be detected is found to exist in the one or more detection passwords split from a piece of identity information, a determination is made that this piece of identity information is not associated with the password to be detected at S304.

If no detection password that is identical with the password to be detected exists in one or more detection passwords split from any piece of identity information, a determination is made that no identity information associated with the password to be detected exists in the identity information set.

An implementation of the method block S103 is described with reference to FIGS. 3 and 4 above in detail, and FIG. 1 is returned hereinafter for subsequent description. At S104, if identity information associated with the password to be detected exists in the identity information set, a determination is made that the password to be detected is a weak password.

Specifically, the plurality of pieces of identity information in the identity information set are processed according to the method blocks S301-S304 one by one to determine whether each piece of identity information is associated with the password to be detected separately. If any piece of identity information in the identity information set is associated with the password to be detected, this indicates that the user sets up the password to be detected using that piece of identity information. As such, the password to be detected may be prone to cracking, and thus is a weak password.

If no identity information associated with the password to be detected exists in the identity information set, this indicates that the password to be detected is not associated with any piece of identity information in the identity information set. In other words, the user does not use any piece of identity information in the identity information set to set up the password to be detected. As such, a determination is made that the password to be detected passes the detection at S105, i.e., the password to be detected is not a weak password, and passes the detection.

The technical solution of the present disclosure may be used for detecting whether a password of a user is set up by the user using identity information of the user or identity information of an associated user closely related thereto, and may be used before or after conducting a weak password detection that employs a weak password dictionary.

The present disclosure further provides an apparatus of detecting a weak password.

Figure 5:
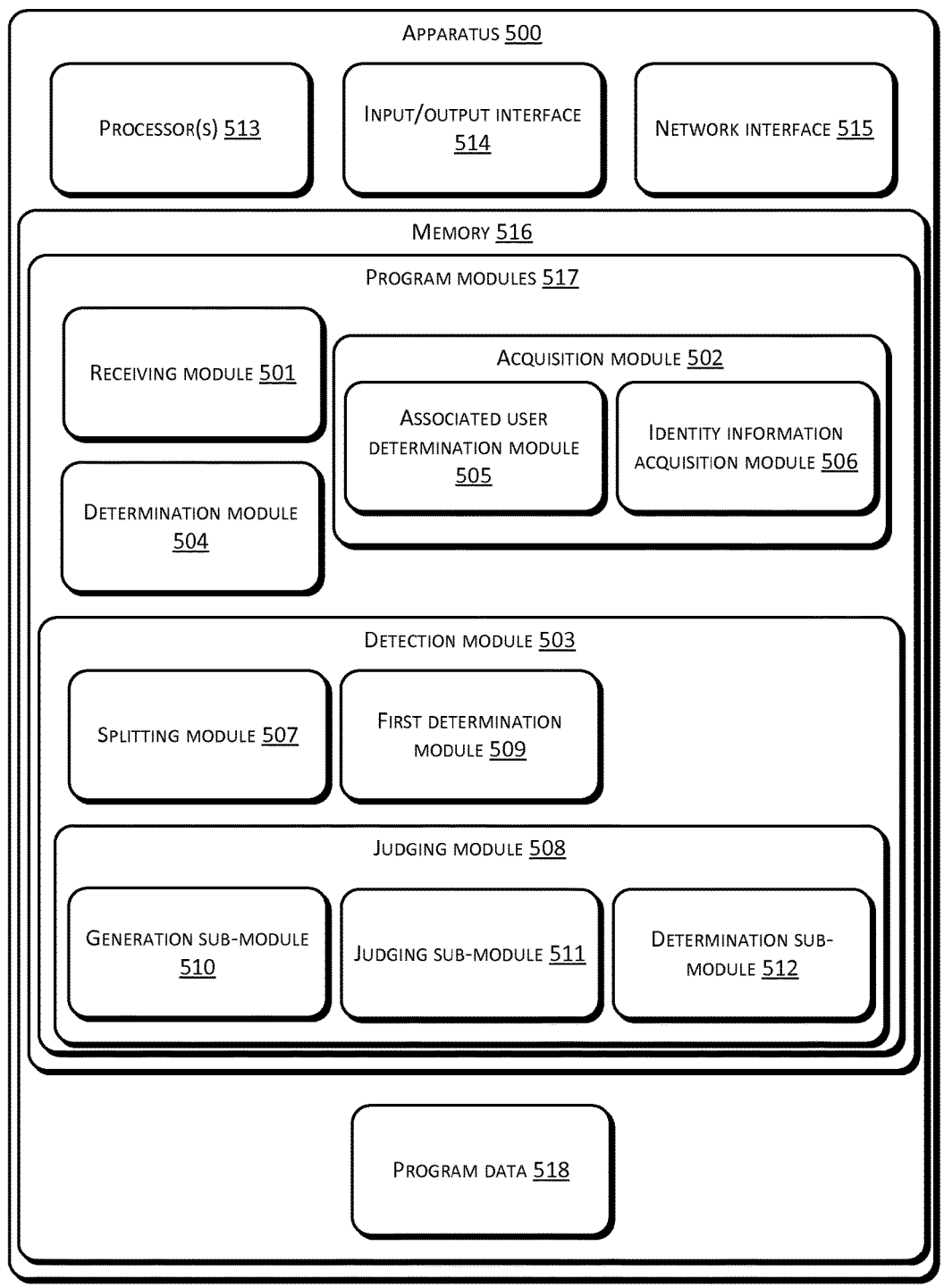
FIG. 5 is a flowchart of an apparatus of detecting a weak password according to an embodiment of the present disclosure.

FIG. 5 schematically shows a structural block diagram of an apparatus of detecting a weak password according to an embodiment of the present disclosure.

According to an embodiment of the present disclosure, the apparatus 500 includes: a receiving module 501, an acquisition module 502, a detection module 503, and a determination module 504.

The receiving module 501 may be used for receiving a password to be detected.

The acquisition module 502 may be used for acquiring an identity information set of a user of the password to be detected, the identity information set including multiple pieces of identity information of the user and associated users thereof.

The detection module 503 may be used for detecting whether identity information associated with the password to be detected exists in the identity information set.

The determination module 504 may be used for determining that the password to be detected is a weak password if the identity information associated with the password to be detected exists in the identity information set.

According to an embodiment of the present disclosure, the acquisition module 502 may include: an associated user determination module 505 and an identity information acquisition module 506.

The associated user determination module 505 may be used for determining one or more associated users of the user based on behavior data of the user.

The identity information acquisition module 506 may be used for obtaining one or more pieces of identity information of the user and one or more pieces of identity information of each associated user in the one or more associated users to form the identity information set of the user.

According to an embodiment of the present disclosure, the detection module 503 may include: a splitting module 507, a judging module 508 and a first determination module 509.

The splitting module 507 may be used for dividing each piece of identity information in the identity information set into one or more detection passwords according to a length of the password to be detected.

The judging module 508 may be used for determining whether a detection password that is identical with the password to be detected exists in the one or more detection passwords divided from each piece of identity information.

The first determination module 509 may be used for determining that a piece of identity information is associated with the password to be detected when a detection password that is identical with the password to be detected exists in one or more detection passwords split from the piece of identity information.

According to an embodiment of the present disclosure, the judging module 508 may include: a generation sub-module 510, a judging sub-module 511, and a determination sub-module 512.

The generation sub-module 510 may be used for individually encrypting the one or more detection passwords using a particular secret key to generate one or more detection ciphertexts corresponding to one or more detection passwords.

The judging sub-module 511 may be used for determining whether a detection ciphertext that is identical with a ciphertext of the password to be detected exists in the one or more detection ciphertexts, wherein the ciphertext of the password to be detected is generated by encrypting the password to be detected using the particular secret key.

The determination sub-module 512 may be used for determining that a detection password that is identical with the password to be detected exists in the one or more detection passwords if a detection ciphertext that is identical with the ciphertext of the password to be detected exists in the one or more detection ciphertexts.

Since the functions implemented by the apparatus 500 of this embodiment basically correspond to the method embodiments as shown in FIGS. 1-4 above, parts that are not described in detail in this embodiment may be referenced to related description in the foregoing embodiments, and are not redundantly described herein.

Furthermore, the apparatus 500 may be implemented as one or more computing devices. In a typical configuration, a computing device includes one or more processors/central processing units (CPUs) 513, an input/output interface 514, a network interface 515 and memory 516.

The memory 516 may include a form of a computer readable media such as volatile memory, random access memory (RAM) and/or non-volatile memory, such as read-only memory (ROM) or flash RAM. The memory 516 is an example of a computer readable media.

The computer readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The memory 516 may include program module 517 and program data 518. The foregoing modules and/or sub-modules may be included in the memory 516, e.g., program module 517. Details of these modules and sub-modules may be found in the foregoing description and are therefore not redundantly described herein.

It should be further noted that, terms such as "comprise", "include" or any other variations thereof are meant to cover the non-exclusive inclusions. The process, method, product or apparatus that includes a series of elements not only includes those elements, but also includes other elements that are not explicitly listed, or further includes elements that already existed in such process, method, product or apparatus. In a condition without further limitations, an element defined by the phrase "include a/an" does not exclude any other similar elements from existing in the process, method, product or apparatus.

One skilled in the art should understand that the embodiments of the present disclosure may be provided as a method, a system or a computer program product. Therefore, the present disclosure may be implemented as a completely hardware embodiment, a completely software embodiment, or an embodiment which is a combination of software and hardware. Moreover, the present disclosure may be in a form of a computer program product implemented in one or more computer usable storage media (including, but not limited to, a magnetic disk storage device, a CD-ROM, an optical storage device, and the like) including computer usable program codes.

The above descriptions are merely exemplary embodiments of the present disclosure, and are not intended to limit the present disclosure. For one skilled in the art, the present disclosure may have various modifications and variations. Any modifications, equivalent replacements, improvements or the like made without departing from the spirit and principle of the present disclosure shall be included in the claim scope of the present disclosure.

What is claimed is:

1. A method implemented by one or more computing devices, the method comprising:
   receiving a password to be detected;

acquiring an identity information set including a plurality of pieces of identity information of a user of the password to be detected and associated users thereof, wherein the associated users comprise at least one or more associated users determined based at least in part on behavior data of interaction activities and browsing activities of the user;

detecting whether identity information associated with the password to be detected exists in the identity information set, the detecting comprising:

dividing each piece of identity information in the identity information set into one or more detection passwords based on a length of the password to be detected; and determining whether a detection password that is identical with the password to be detected exists in the one or more detection passwords divided from each piece of identity information;

determining whether the password to be detected is a weak password based at least in part on a result of the detecting.

2. The method of claim 1, further comprising determining that the password to be detected is the weak password in response to detecting that the identity information associated with the password to be detected exists in the identity information set.

3. The method of claim 1, further comprising determining that the password to be detected is not the weak password in response to detecting that no identity information associated with the password to be detected exists in the identity information set.

4. The method of claim 1, wherein acquiring the identity information set comprises acquiring one or more pieces of identity information of the user and one or more pieces of identity information of each associated user of the one or more associated users to form the identity information set.

5. The method of claim 1, further comprising determining that a particular piece of identity information is associated with the password to be detected in response to determining that the password to be detected is identical with one of corresponding one or more detection passwords divided from the particular piece of identity information.

6. The method of claim 1, further comprising determining that no identity information is associated with the password to be detected if no detection password identical with the password to be detected is found to exist in the one or more detection passwords divided from each piece of identity information.

7. The method of claim 1, wherein determining whether the detection password that is identical with the password to be detected exists in the one or more detection passwords divided from each piece of identity information comprises:

individually encrypting the one or more detection passwords using a particular secret key to generate one or more detection ciphertexts corresponding to the one or more detection passwords; and determining whether a detection ciphertext that is identical with a ciphertext of the password to be detected exists in the one or more detection ciphertexts, wherein the ciphertext of the password to be detected is generated by encrypting the password to be detected using the particular secret key.

8. The method of claim 7, further comprising determining that the detection password that is identical with the password to be detected exists in the one or more detection passwords if the detection ciphertext that is identical with the ciphertext of the password to be detected exists in the one or more detection ciphertexts.

9. The method of claim 1, wherein the interaction activities comprise a transaction activity between the user and a first user of the one or more associated users, and the browsing activities comprise an activity of the user to browse data of a second user.

10. An apparatus for detecting a weak password, comprising:

a receiving module used for receiving a password to be detected;

an acquisition module used for acquiring an identity information set including a plurality of pieces of identity information of a user of the password to be detected and associated users thereof, wherein the associated users comprise at least one or more associated users determined based at least in part on behavior data of interaction activities and browsing activities of the user;

a detection module used for detecting whether identity information associated with the password to be detected exists in the identity information set, wherein the detection module comprises:

a splitting module used for splitting each piece of identity information in the identity information set into one or more detection passwords according to a length of the password to be detected; and a judging module used for determining whether a detection password identical with the password to be detected exists in the one or more detection passwords split from each piece of identity information; and a determination module used for determining that the password to be detected is a weak password if the identity information associated with the password to be detected exists in the identity information set.

11. The apparatus of claim 10, wherein the acquisition module comprises: an identity information acquisition module used for acquiring one or more pieces of identity information of the user and one or more pieces of identity information of each associated user in the one or more associated users to form the identity information set.

12. The apparatus of claim 10, wherein the detection module further comprises:

a first determination module used for determining that a particular piece of identity information is associated with the password to be detected in response to determining that the password to be detected exists in is identical with one of respective one or more detection passwords split from the particular piece of the identity information.

13. The apparatus of claim 10, wherein the judging module comprises:

a generation sub-module configured to separately encrypt the one or more detection passwords using a particular secret key to generate one or more detection ciphertexts corresponding to the one or more detection passwords;

a judging sub-module configured to determine whether a detection ciphertext identical with a ciphertext of the password to be detected exists in the one or more detection ciphertexts, wherein the ciphertext of the password to be detected is generated by encrypting the password to be detected using the particular secret key; and a determination sub-module used for determining that the detection password identical with the password to be detected exists in the one or more detection passwords if the detection ciphertext identical with the ciphertext of the password to be detected exists in the one or more detection ciphertexts.

14. One or more computer readable media storing executable instructions that, when executed by one or more processors, cause the one or more processors to perform acts comprising:
    receiving a password to be detected;
    acquiring an identity information set including a plurality of pieces of identity information of a user of the password to be detected and associated users thereof, wherein the associated users comprise at least one or more associated users determined based at least in part on behavior data of interaction activities and browsing activities of the user;
    detecting whether identity information associated with the password to be detected exists in the identity information set, the detecting comprising:
        dividing each piece of identity information in the identity information set into one or more detection passwords having a same length of the password to be detected; and
        determining whether a detection password that is identical with the password to be detected exists in the one or more detection passwords divided from each piece of identity information;
    determining whether the password to be detected is a weak password based at least in part on a result of the detecting.

15. The one or more computer readable media of claim 14, the acts further comprising determining that the password to be detected is the weak password in response to detecting that the identity information associated with the password to be detected exists in the identity information set.

16. The one or more computer readable media of claim 14, the acts further comprising determining that the password to be detected is not the weak password in response to detecting that no identity information associated with the password to be detected exists in the identity information set.

17. The one or more computer readable media of claim 14, wherein acquiring the identity information set comprises acquiring one or more pieces of identity information of the user and one or more pieces of identity information of each associated user of the one or more associated users to form the identity information set.

18. The one or more computer readable media of claim 14, the acts further comprising determining that a particular piece of identity information is associated with the password to be detected in response to determining that the password to be detected is identical with one of respective one or more detection passwords split from the particular piece of identity information.

19. The one or more computer readable media of claim 14, wherein determining whether the detection password that is identical with the password to be detected exists in the one or more detection passwords divided from each piece of identity information comprises:
    individually encrypting the one or more detection passwords using a particular secret key to generate one or more detection ciphertexts corresponding to the one or more detection passwords;
    determining whether a detection ciphertext that is identical with a ciphertext of the password to be detected exists in the one or more detection ciphertexts, wherein the ciphertext of the password to be detected is generated by encrypting the password to be detected using the particular secret key; and
    determining that the detection password that is identical with the password to be detected exists in the one or more detection passwords if the detection ciphertext that is identical with the ciphertext of the password to be detected exists in the one or more detection ciphertexts.

* * * * *